US012574713B2

(12) United States Patent
Kashyap et al.

(10) Patent No.: US 12,574,713 B2
(45) Date of Patent: Mar. 10, 2026

(54) PROXIMITY SERVICE FOR AI/ML CAPABLE DEVICES

(71) Applicant: Nokia Technologies Oy, Espoo (FI)

(72) Inventors: Bharath Ramesh Kashyap, Bangalore (IN); Hannu Petri Hietalahti, Oulu (FI); Rajesh Babu Natarajan, Bangalore (IN); Malathi Ponniah, Bangalore (IN); Nagaraj Rajagopalan, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 18/573,141

(22) PCT Filed: Jun. 22, 2021

(86) PCT No.: PCT/EP2021/066953
§ 371 (c)(1),
(2) Date: Dec. 21, 2023

(87) PCT Pub. No.: WO2022/268295
PCT Pub. Date: Dec. 29, 2022

(65) Prior Publication Data
US 2024/0292198 A1     Aug. 29, 2024

(51) Int. Cl.
*H04W 4/80*          (2018.01)
(52) U.S. Cl.
CPC ...................................... *H04W 4/80* (2018.02)
(58) Field of Classification Search
CPC ......... H04W 4/80; H04W 4/70; H04W 76/14; H04W 8/005; H04W 92/18; G06N 20/00
See application file for complete search history.

(56) References Cited

U.S. PATENT DOCUMENTS

| | | | |
|---|---|---|---|
| 10,181,985 B1* | 1/2019 | Passaglia .............. | H04L 67/141 |
| 2015/0056920 A1* | 2/2015 | Huttunen ................ | H04B 7/26 |
| | | | 455/41.2 |

(Continued)

OTHER PUBLICATIONS

"3rd Generation Partnership Project; Technical Specification Group Services and System Aspects; Study on system enhancement for Proximity based Services (ProSe) in the 5G System (5GS) (Release 17)", 3GPP TR 23.752, V0.7.0, Nov. 2020, pp. 1-181.

(Continued)

*Primary Examiner* — Fayyaz Alam
(74) *Attorney, Agent, or Firm* — Nokia Technologies Oy

(57) ABSTRACT

An apparatus for use by a communication element or function configured to communicate by using proximity service communication and having artificial intelligence and/or machine learning capabilities, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a discovery procedure with a proximity service control element or function in which a discovery request is transmitted to the proximity service control element or function, the discovery request comprising an identification of an artificial intelligence and/or machine learning proximity service application and an indication of artificial intelligence and/or machine learning capabilities of the communication element or function which can be made available for another communication element or function using proximity service, and to conduct, when authorization of the discovery request is obtained from the proximity service control element or function, a procedure for allowing establishment of a direct communication with another communication element or function by using proximity service wherein information (Continued)

included in the discovery request are transmitted via an interface for the direct communication with the another communication element or function.

19 Claims, 8 Drawing Sheets

(56)                    References Cited

U.S. PATENT DOCUMENTS

| | | | | |
|---|---|---|---|---|
| 2016/0127863 | A1* | 5/2016 | Yoon | H04L 67/52 |
| | | | | 455/456.3 |
| 2017/0257751 | A1* | 9/2017 | Atarius | H04W 8/005 |
| 2021/0266726 | A1* | 8/2021 | Chun | H04W 8/005 |
| 2023/0413171 | A1* | 12/2023 | Perras | H04W 92/18 |

OTHER PUBLICATIONS

"3rd Generation Partnership Project; Technical Specification Group Services and System Aspects; Proximity-based services (ProSe); Stage 2 (Release 16)", 3GPP TS 23.303, V16.0.0, Jul. 2020, pp. 1-130.

"3rd Generation Partnership Project; Technical Specification Group Core Network and Terminals; Proximity-services (ProSe) User Equipment (UE) to ProSe function protocol aspects; Stage 3 (Release 16)", 3GPP TS 24.334, V16.0.0, Jul. 2020, pp. 1-264.

"3rd Generation Partnership Project; Technical Specification Group Services and System Aspects; Study on traffic characteristics and performance requirements for AI/ML model transfer in 5GS (Release 18)", 3GPP TR 22.874, V0.1.0, Sep. 2020, pp. 1-55.

"Is your smartphone ready for AI?", ai-benchmark, Retrieved on Mar. 28, 2024, Webpage available at : https://ai-benchmark.com/.

"Apple", Apple, Retrieved on Mar. 28, 2024, Webpage available at : https://www.apple.com/.

"3rd Generation Partnership Project, Technical Specification Group Services and System Aspects; Architecture enhancements for 5G System (5GS) to support Vehicle to-Everything (V2X) services (Release 16)"; 3GPP TS 23.287, V16.5.0, Dec. 2020, pp. 1-58.

"3rd Generation Partnership Project; Technical Specification Group Core Network and Terminals; Vehicle-to-Everything (V2X) services in 5G System (5GS); Stage 3 (Release 17)", 3GPP TS 24.587, V17.1.0, Mar. 2021, pp. 1-115.

International Search Report and Written Opinion received for corresponding Patent Cooperation Treaty Application No. PCT/EP2021/066953, dated Feb. 28, 2022, 13 pages.

"FS_AMMT—New use-case on local AI/ML model split on factory robots", 3GPP TSG-SA WG1 Meeting #93-e, S1-210024r1, Agenda Item: 7.4.1, InterDigital, Feb. 22-Mar. 4, 2021, 9 pages.

"3rd Generation Partnership Project; Technical Specification Group Services and System Aspects; Study on AI/ML Model Transfer Phase 2 (Release 19)", 3GPP TR 22.876, V19.1.0, Sep. 2023, pp. 1-40.

* cited by examiner

S410  CONDUCT DISCOVERY PROCEDURE WITH PROSE FUNCTION

S420  CONDUCT PROCEDURE FOR ESTABLISHMENT OF DIRECT COMMUNICATION WITH OTHER UE (UE A)

S430  AI/ML PROSE APPLICATION PROCESS WITH UE A

RETURN

PROXIMITY SERVICE FOR AI/ML CAPABLE DEVICES

RELATED APPLICATION

This application was originally filed as PCT Application No. PCT/EP2021/066953, filed on Jun. 22, 2021, of which is incorporated herein by reference in its entirety.

BACKGROUND

Field

Examples of embodiments relate to apparatuses, methods, systems, computer programs, computer program products and (non-transitory) computer-readable media usable for providing proximity service (ProSe) communication for communication elements or functions which are capable to conduct artificial intelligence and/or machine learning applications. Specifically, examples of embodiments relate to apparatuses, methods, systems, computer programs, computer program products and (non-transitory) computer-readable media usable for allowing AI/ML capable devices/UEs to share AI/ML resources with each other by using ProSe based communication.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3$^{rd}$ Generation Partnership Project
4G fourth generation
5G fifth generation
5GS 5G system
AI artificial intelligence
AP access point
BS base station
CN core network
CPU central processing unit
D2D device to device
eNB E-UTRAN Node B
gNB next generation node B
EPC evolved packet core
ID identification
IE information element
IP Internet protocol
LTE Long Term Evolution
LTE-A LTE Advanced
ML machine learning
NW network, network side
PLMN public land mobile network
ProSe proximity service
QoE quality of experience
RAN radio access network
RAT radio access technology
UE user equipment

SUMMARY

According to an example of an embodiment, there is provided, for example, an apparatus for use by a communication element or function configured to communicate by using proximity service communication and having artificial intelligence or machine learning capabilities, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a discovery procedure with a proximity service control element or function in which a discovery request is transmitted to the proximity service control element or function, the discovery request comprising an identification of an artificial intelligence and/or machine learning proximity service application and an indication of artificial intelligence and/or machine learning capabilities of the communication element or function which can be made available for another communication element or function using proximity service, and to conduct, when authorization of the discovery request is obtained from the proximity service control element or function, a procedure for allowing establishment of a direct communication with another communication element or function by using proximity service wherein information included in the discovery request are transmitted via an interface for the direct communication with the another communication element or function.

Furthermore, according to an example of an embodiment, there is provided, for example, a method for use in a communication element or function configured to communicate by using proximity service communication and having artificial intelligence or machine learning capabilities, the method comprising conducting a discovery procedure with a proximity service control element or function in which a discovery request is transmitted to the proximity service control element or function, the discovery request comprising an identification of an artificial intelligence and/or machine learning proximity service application and an indication of artificial intelligence and/or machine learning capabilities of the communication element or function which can be made available for another communication element or function using proximity service, and conducting, when authorization of the discovery request is obtained from the proximity service control element or function, a procedure for allowing establishment of a direct communication with another communication element or function by using proximity service wherein information included in the discovery request are transmitted via an interface for the direct communication with the another communication element or function.

According to further refinements, these examples may include one or more of the following features:

when conducting the procedure for allowing establishment of a direct communication with the another communication element or function, a direct communication channel may be established via a proximity service interface to the another communication element or function, with the another communication element of function, a procedure for realizing artificial intelligence and/or machine learning use case according to the artificial intelligence and/or machine learning proximity service application may be negotiated, and data may be exchanged with the another communication element or function for providing an artificial intelligence and/or machine learning service;

the discovery procedure to be conducted with a proximity service control element or function may comprise one of a first procedure in which the communication element or function is configured to announce information usable by the another communication element or function for deciding on an establishment of a direct connection, wherein the procedure for allowing establishment of a direct communication with the another communication element or function comprises broadcasting the information included in the discovery request, and a second procedure in which the communication element or function is configured to represent a discoveree receiving information from the another communication element or function for deciding on an establishment of a direct connection, wherein the procedure for allowing establishment of a direct communication with the another communication element or function comprises reacting on a request message from the another communication element or functions;

the indication of artificial intelligence and/or machine learning capabilities of the communication element or function may comprise an indication of a parameter allowing to determine and compare a capability of the communication element or function regarding artificial intelligence and/or machine learning performance, wherein the identification of an artificial intelligence and/or machine learning proximity service application may indicate a use case;

the use case may be related to a commercial service using artificial intelligence and/or machine learning.

According to an example of an embodiment, there is provided, for example, an apparatus for use by a communication element or function configured to communicate by using proximity service communication and having artificial intelligence and/or machine learning capabilities, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a discovery procedure with a proximity service control element or function in which a discovery request is transmitted to the proximity service control element or function, the discovery request comprising an identification of an artificial intelligence and/or machine learning proximity service application, to conduct, when authorization of the discovery request is obtained from the proximity service control element or function, a procedure for allowing establishment of a direct communication with another communication element or function by using proximity service, wherein the identification of the artificial intelligence and/or machine learning proximity service application is used for identifying another communication element or function for direct communication, to obtain, when the another communication element or function is found, an indication of artificial intelligence and/or machine learning capabilities of the another communication element or function which can be made available by the another communication element or function in a matching report procedure with the proximity service control element or function, and to decide on whether the another communication element or function is contacted for the artificial intelligence and/or machine learning proximity service application on the basis of a processing of the obtained indication of artificial intelligence and/or machine learning capabilities of the another communication element or function.

Furthermore, according to an example of an embodiment, there is provided, for example, a method for use in a communication element or function configured to communicate by using proximity service communication and having artificial intelligence and/or machine learning capabilities, the method comprising conducting a discovery procedure with a proximity service control element or function in which a discovery request is transmitted to the proximity service control element or function, the discovery request comprising an identification of an artificial intelligence and/or machine learning proximity service application, conducting, when authorization of the discovery request is obtained from the proximity service control element or function, a procedure for allowing establishment of a direct communication with another communication element or function by using proximity service, wherein the identification of the artificial intelligence and/or machine learning proximity service application is used for identifying another communication element or function for direct communication, obtaining, when the another communication element or function is found, an indication of artificial intelligence and/or machine learning capabilities of the another communication element or function which can be made available by the another communication element or function in a matching report procedure with the proximity service control element or function, and deciding on whether the another communication element or function is contacted for the artificial intelligence and/or machine learning proximity service application on the basis of a processing of the obtained indication of artificial intelligence and/or machine learning capabilities of the another communication element or function.

According to further refinements, these examples may include one or more of the following features:

when conducting the procedure for allowing establishment of a direct communication with the another communication element or function, a direct communication channel may be established via a proximity service interface to the another communication element or function, with the another communication element of function, a procedure for realizing artificial intelligence and/or machine learning use case according to the artificial intelligence and/or machine learning proximity service application may be negotiated, and data may be exchanged with the another communication element or function for providing an artificial intelligence and/or machine learning service;

the discovery procedure to be conducted with a proximity service control element or function may comprise one of a first procedure in which the communication element or function is configured to monitor for information usable for deciding on an establishment of a direct connection, wherein the procedure for allowing establishment of a direct communication with the another communication element or function comprises monitoring for the information included in the discovery request, and a second procedure in which the communication element or function is configured to represent a discoverer providing information to another communication element or function for determining whether the another communication element or function is capable of the artificial intelligence and/and/or machine learning proximity service application, wherein the procedure for allowing establishment of a direct communication with the another communication element or function comprises transmitting a request message via a proximity service interface to the another communication element or function;

the indication of artificial intelligence and/or machine learning capabilities of the another communication element or function may comprise an indication of a parameter allowing to determine and compare a capability of the another communication element or function regarding artificial intelligence and/or machine learning performance, wherein the identification of an artificial intelligence and/or machine learning proximity service application may indicate a use case; the use case may be related to a commercial service using artificial intelligence and/or machine learning.

According to an example of an embodiment, there is provided, for example, an apparatus for use by a communication network element or function configured to act as a proximity service control element or function for a proximity service communication, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a discovery procedure with a communication element or function configured to communicate by using proximity service, wherein a discovery request is received from the communication element or function, the discovery request comprising an identification of an artificial intelligence and/or machine learning proximity service application and an indication of artificial intelligence and/or machine learning capabilities of the communication element or function which can be made available for another communication element or function using proximity service, to store the indication of artificial intelligence and/or machine learning capabilities of the communication element or function, and to conduct an authorization process for the discovery request for enabling a procedure for allowing establishment of a direct communication of the communication element or function with another communication element or function by using proximity service.

Furthermore, according to an example of an embodiment, there is provided, for example, a method for use in a communication network element or function configured to act as a proximity service control element or function for a proximity service communication, the method comprising conducting a discovery procedure with a communication element or function configured to communicate by using proximity service, wherein a discovery request is received from the communication element or function, the discovery request comprising an identification of an artificial intelligence and/or machine learning proximity service application and an indication of artificial intelligence and/or machine learning capabilities of the communication element or function which can be made available for another communication element or function using proximity service, storing the indication of artificial intelligence and/or machine learning capabilities of the communication element or function, and conducting an authorization process for the discovery request for enabling a procedure for allowing establishment of a direct communication of the communication element or function with another communication element or function by using proximity service.

According to further refinements, these examples may include one or more of the following features:
   a discovery procedure may be conducted with another communication element or function configured to communicate by using proximity service, wherein a discovery request may be received from the another communication element or function, the discovery request comprising an identification of an artificial intelligence and/or machine learning proximity service application, after the discovery request of the another communication element or function is authorized, a matching report of the another communication element or function indicating the communication element or function may be received, and the matching report may be processed, and the another communication element or function may be provided with the stored indication of artificial intelligence and/or machine learning capabilities of the communication element or function;
   the indication of artificial intelligence or machine learning capabilities of the communication element or function may comprise an indication of a parameter allowing to determine and compare a capability of the communication element or function regarding artificial intelligence and/or machine learning performance, wherein the identification of an artificial intelligence and/or machine learning proximity service application may indicate a use case;
   the use case may be related to a commercial service using artificial intelligence and/or machine learning.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
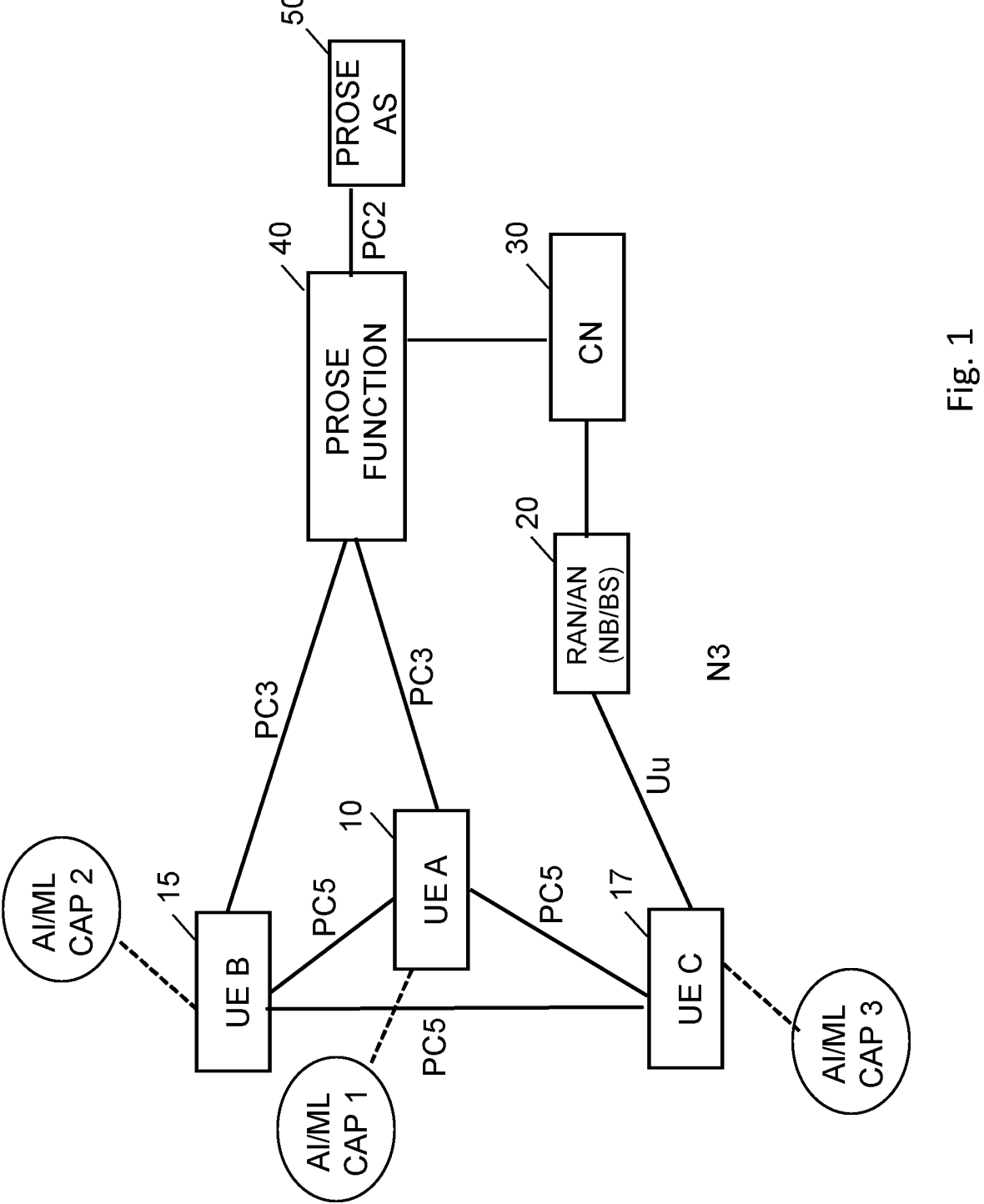
FIG. 1 shows a diagram illustrating an example of a communication network in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WIMAX Forum and the like are working on standards or specifications for telecommunication network and access environments.

Artificial Intelligence and machine learning have become an integral part of many terminal devices such as UEs. Some typical commercial use cases that are accomplished by using AI/ML are related, for example, to upscaling of videos (e.g. 2K to 4K), image recognition, image classification in order to provide a specific photo among a collection of photos, photo editing and filtering, and AI procedures in programs, such as in mobile games.

ML can be specified as computer algorithms that improve automatically through experience and by the use of data. ML is seen as a part of AI. Machine learning algorithms build a model based on sample data, known as training data, in order to make predictions or decisions without being explicitly programmed to do so. ML algorithms are used in a wide variety of applications, where it is difficult or unfeasible to develop conventional algorithms to perform the needed tasks.

An ML lifecycle can be broken up into two main, distinct parts. The first is the training phase, in which an ML model is created or "trained" by running a specified subset of data into the model. ML inference is the second phase, in which the model is put into action on live data to produce actionable output. The data processing by the ML model is often referred to as scoring, so one can say that the ML model scores the data, and the output is a score.

However, AI/ML capabilities of UEs are only increasing with advancements in systems on a chip (SoCs) and dedicated AI hardware designed to run machine learning workloads. A UE's AI/ML capability can be categorized into 2 main parts, i.e. a neural engine, which represents a hardware part and is only difficult to be changed, and model and training data which are required for improving the output of the neural engine which depends on the used AI/ML models and its training/inference data.

In view of the situation that there are various AI/ML capability levels across different UEs and varied set of data available to different UEs, it is desirable that the different UEs can cooperate with each other in order to increase their performance using AI/ML applications.

Such a cooperation can be achieved by different measures. For example, UEs can exchange model information with each other for federated learning. Furthermore, the UEs in proximity can exchange training data with each other to mutually enhance AI/ML capability of the UEs. Moreover, the AI/ML capability of a UE can be used by another UE to realize AI/ML use cases.

Principles of embodiments of the invention are based on the assumption that at any given point in time, there can be a plurality of UEs having diverse AI/ML capabilities in close proximity to each other. Due to this, it can be considered that, for example, a more AI/ML capable UE (i.e. a UE having a higher AI/ML capability level, in relation to another UE) can aid a less AI/ML capable UE (i.e. a UE having a lower AI/ML capability level, in relation to the first UE) to realize its AI/ML use cases. Such a measure has several benefits. For example, the UE which provides the AI/ML services (which is usually the UE having the higher AI/ML capability level) can improve its AI/ML efficiency. On the other hand, the UE which receives the AI/ML services (which is usually the UE having the lower AI/ML capability level) can realize its AI/ML use cases in an improved manner.

According to examples of embodiments, measures are provided so as to deal with the following points. That is, according to examples of embodiments, it is to be considered in which manner a UE is able to identify which other UE(s) in its proximity can provide AI/ML services that allows to improve its own AI/ML efficiency. Another point to be considered is how a UE is able to discover the AI/ML capabilities of other UE(s) in its proximity. Moreover, it is to be considered how a UE is able to go about realizing its use cases using the AI/ML capability of another UE in its close proximity. Corresponding measures shall be also available for commercial use case.

Consequently, according to examples of embodiments, measures are proposed which allow that a UE's AI/ML capability can be defined and announced in a communication network, such as a 3GPP based network. For this purpose, for example, an information element can be configured which indicates the UE's AI/ML capability.

Furthermore, UEs are configured to be able to discover the AI/ML capability of other UEs in its proximity. For this purpose, for example, D2D communication mechanisms can be used, such as a ProSe, wherein corresponding interfaces can be adapted so as to enable that the AI/ML capability is discovered e.g. as a part of a discovery procedure (in case of ProSe, for example, a discovery procedure according to either Model A or Model B, as discussed below). Moreover, it is to be enabled that the AI/ML capabilities of a UE can be shared by other UE(s) so as to realize their AI/ML use cases, wherein the D2D interface (e.g. ProSe interface) can be used by employing a direct communication (after authorization is successful, if required).

By means of examples of embodiments, it is possible to facilitate the overall improvement of QoE of AI/ML use cases since an exchange of model data, training data and the like from various devices of different AI/ML capabilities is enabled. Moreover, the load of operator network can be reduced since the data exchange is made by using D2D communication having a reduced impact on the network infrastructure.

In the following, different exemplifying embodiments will be described for illustrating a processing in which way a UE can discover, communicate and share AI/ML capabilities with other UEs in its proximity. For this, as an example of a communication network to which examples of embodiments may be applied, a communication network architecture based on 3GPP standards for a communication network, such as LTE or 5G/NR, is used, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication networks as well.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, such as management elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

In a traditional cellular communication network, for properly establishing and handling a communication between two or more end points (e.g. communication stations or elements, such as terminal devices, user equipments (UEs), or other communication network elements, a database, a server, host etc.), one or more network elements or functions, such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

However, in order to provide higher data rate services (e.g., video sharing, gaming, proximity aware social networking etc.), the concept of direct communications of two communication elements like UEs has been developed, which is also referred to as D2D. D2D allows to increase the spectral efficiency of the network, to improve throughput, energy efficiency, delay, and other conditions. That is, D2D communications facilitate service optimization and spectrum/capacity efficiency in mobile communication networks.

D2D communication for 3GPP based networks is also referred to as Proximity Services (ProSe). ProSe is used e.g. in commercial and non-commercial scenarios, like geofencing, social networking, shops advertising, etc., and public safety deployments e.g. police, ambulance, etc.

A ProSe functionality is used by a specific application in the communication element or function, like a UE, which is referred to as ProSe application. ProSe features consist of two basic functions: ProSe discovery (direct or network level) and ProSe direct communication.

ProSe discovery identifies that a ProSe-enabled UEs are in proximity, using for example the network's RAN (e.g. E-UTRAN or 5G NR), other access technologies like WLAN or the EPC (e.g. based on location tracking in the EPC network) or 5GC (5G core network).

As ProSe discovery mechanisms, the following can be mentioned: a core network (EPC for LTE/5GC for 5G) assisted discovery, and direct discovery. In direct discovery, ProSe-enabled UEs announce and/or listen to dedicated/shared radio resources in order to discover each other's presence. The announcements may contain the identity of a specific application and the UEs identity. UEs using the same ProSe application, subscription, and necessary authorization can then discover each other. That is, a ProSe enabled UE can thus announce (i.e., periodically transmit ProSe discovery message) or monitor (i.e., periodically listen to ProSe announcing UEs and possibly sending discovery responses to an announcing UE).

There are two types of ProSe direct discovery: open and restricted. Open is the case where there is no explicit permission that is needed from the UE being discovered, whereas restricted discovery only takes place with explicit permission from the UE that is being discovered. Furthermore, there are two models for ProSe direct discovery which are referred to as Model A and Model B.

Model A model defines two roles for the ProSe-enabled UEs that are participating in ProSe direct discovery, i.e. that of an announcing UE (the UE announces certain information that could be used by UEs in proximity that have permission to discover), and that of a monitoring UE (the UE that monitors certain information of interest in proximity of announcing UEs). In this model the announcing UE broadcasts discovery messages at pre-defined discovery intervals and the monitoring UEs that are interested in these messages read them and process them.

Model B defines two roles for the ProSe-enabled UEs that are participating in ProSe direct discovery, i.e. that of a discoverer UE (the UE transmits a request containing certain information about what it is interested to discover) and that of a discoveree UE (the UE that receives the request message can respond with some information related to the discoverer's request).

On the other hand, ProSe direct communication enables establishment of communication paths between two or more ProSe-enabled UEs that are in direct communication range. The ProSe direct communication path uses, for example, the RAN (e.g. E-UTRAN in LTE, NR in 5G) or WLAN.

ProSe discovery precedes ProSe communication in time, while ProSe communication may use information acquired during ProSe discovery. The direct discovery mechanisms are based e.g. on UEs sending announcements over the proximity radio interface and on ProSe UEs that are monitoring those.

For illustrative purposes, a network structure based on 3GPP is described in which examples of embodiments can be implemented. Specifically, in the following, a processing is described in which way a UE can discover, communicate and share AI/ML capabilities with other UEs in its proximity. For the sake of illustration, a case is considered in which 3 UEs (referred to as UE A, UE B and UE C) are located in proximity with each other. However, principles of the invention can be applied to cases where a different number of UEs is involved.

Specifically, FIG. 1 shows a diagram illustrating an example of a system architecture of a wireless communication network based on 3GPP in which examples of embodiments are implementable. It is to be noted that the illustration in FIG. 1 mainly shows parts of a complete network architecture which are useful for understanding principles of embodiments of the disclosure, while other elements and interfaces are omitted in the illustration.

Reference numbers 10, 15 and 17 denote communication elements or functions, such as a respective UE (UE A, UE B, UE C), which is enabled to conduct a D2D communication, such as a ProSe-enabled UE. UEs 10, 15 and 18 may support, for example, to exchange ProSe control information between the ProSe-enabled UE and a ProSe function (described below) over a specific reference point, and to execute procedures for open and restricted ProSe direct discovery of other ProSe-enabled UEs over another reference point. The UEs 10, 15 and 18 may have a respective ProSe application which is configured to use the ProSe functionality.

Furthermore, as indicated in FIG. 1, each UE 10, 15 and 18 has a respective AI/ML capability. For example, AI/ML capability is represented by a set of AI/ML related benchmarks. The benchmarks may be related to parameters which may comprise, for example, an indication related to a processing capacity of the UE, which is expressed, for example, by means of the number of processing cores or type of neural engine of the UE; indication regarding an inference level of the UE; and an indication regarding a training level of the UE. In the configuration shown in FIG. 1, it is assumed that the UEs 10, 15 and 18 have the following AI/ML capabilities:

UE A 10: AI/ML capability 1 with: 10 cores, 4 inference, 5 training

UE B 15: AI/ML capability 2 with: 5 cores, 3 inference, 2 training

UE C 18: AI/ML capability 3 with: 4 cores, 3 inference, 5 training

It is to be noted that the higher the value of the parameters the higher the AI/ML capability level is.

Reference sign 40 denotes a ProSe function. The ProSe function 40 is, for example, a logical function that is used for network related actions required for ProSe. The ProSe function plays different roles for each of the features of ProSe. For example, there is one logical ProSe function 40 in the network (i.e. one ProSe function in each PLMN that supports ProSe).

The ProSe function 40 has, for example, the following sub-functions that perform different roles depending on the ProSe feature. One function is a so-called direct provisioning function used to provide a UE with necessary parameters in order to use ProSe direct discovery and ProSe direct communication, such as parameters allowing the UE to use ProSe in the network area. Another function is a direct discovery name management function used for open ProSe direct discovery to allocate and process the mapping of ProSe applications IDs and ProSe application codes used in ProSe direct discovery. It uses ProSe related subscriber data for authorisation for each discovery request. It also provides the UE with the necessary security material in order to protect discovery messages transmitted over the air. In restricted ProSe direct discovery, it also interacts with a ProSe application server 50 (described later) via a specific reference point for the authorization of the discovery requests. A further function is the EPC-level/5GC discovery ProSe function used for EPC/5GC level discovery processing.

Reference sign 20 denotes an access network (AN) or RAN, such as a E-UTRAN/NR, via which the UEs 10, 15 and 18 are connected to the mobile network. The RAN 20 comprises various cells controlled by a corresponding controller, such as an NB, BS, eNB, gNB etc. to which the UEs are connected via Uu links, for example (for the sake of simplicity, only one Uu link is shown in FIG. 1).

Reference sign 30 denotes a core network (CN) having different elements, such as an EPC/5GC. Specifically, reference sign 40 represents management elements or function, gateway elements or functions, and the like.

Reference sign 50 denotes a ProSe application server (AS). The ProSe AS 50 supports, for example, storage of EPC/5GC ProSe User IDs, ProSe function IDs, ProSe discovery UE ID, metadata, etc., the mapping of application layer user IDs and EPC/5GC ProSe user IDs, the maintaining of permission information for restricted ProSe direct discovery, and the like.

The respective elements and functions shown in FIG. 1 are linked to each other by specific reference points or links.

In detail, as shown in FIG. 1, reference point PC2 is defined between the ProSe AS 50 and the ProSe function 40. It is used to define the interaction between ProSe AS 50 and a ProSe functionality provided by the 3GPP EPS via the ProSe function 40 for ProSe direct discovery and the like.

PC3 defines a reference point between the UEs 10, 15 and 18 and the ProSe function 40. PC3 relies on EPC/5GC user plane for transport (i.e. an "over IP" reference point). It is used to authorize ProSe direct discovery and EPC/5GC-level ProSe discovery requests, and perform allocation of ProSe application codes/ProSe restricted codes corresponding to ProSe application IDs used for ProSe direct discovery. Furthermore, it is used to define the authorization policy per network for ProSe direct discovery.

PC5 denotes the reference point between ProSe-enabled UEs, such as UEs 10, 15 and 18, and is used for control and user plane for ProSe direct discovery, ProSe direct communication and ProSe UE-to-Network relay. Lower protocol layers of the PC5 reference point may be based on E-UTRA/NR sidelink capabilities or on WLAN technology, for example.

It is to be noted that there may be further reference points besides those defined above. For example, there can be reference points between ProSe functions in different networks.

Figure 2:
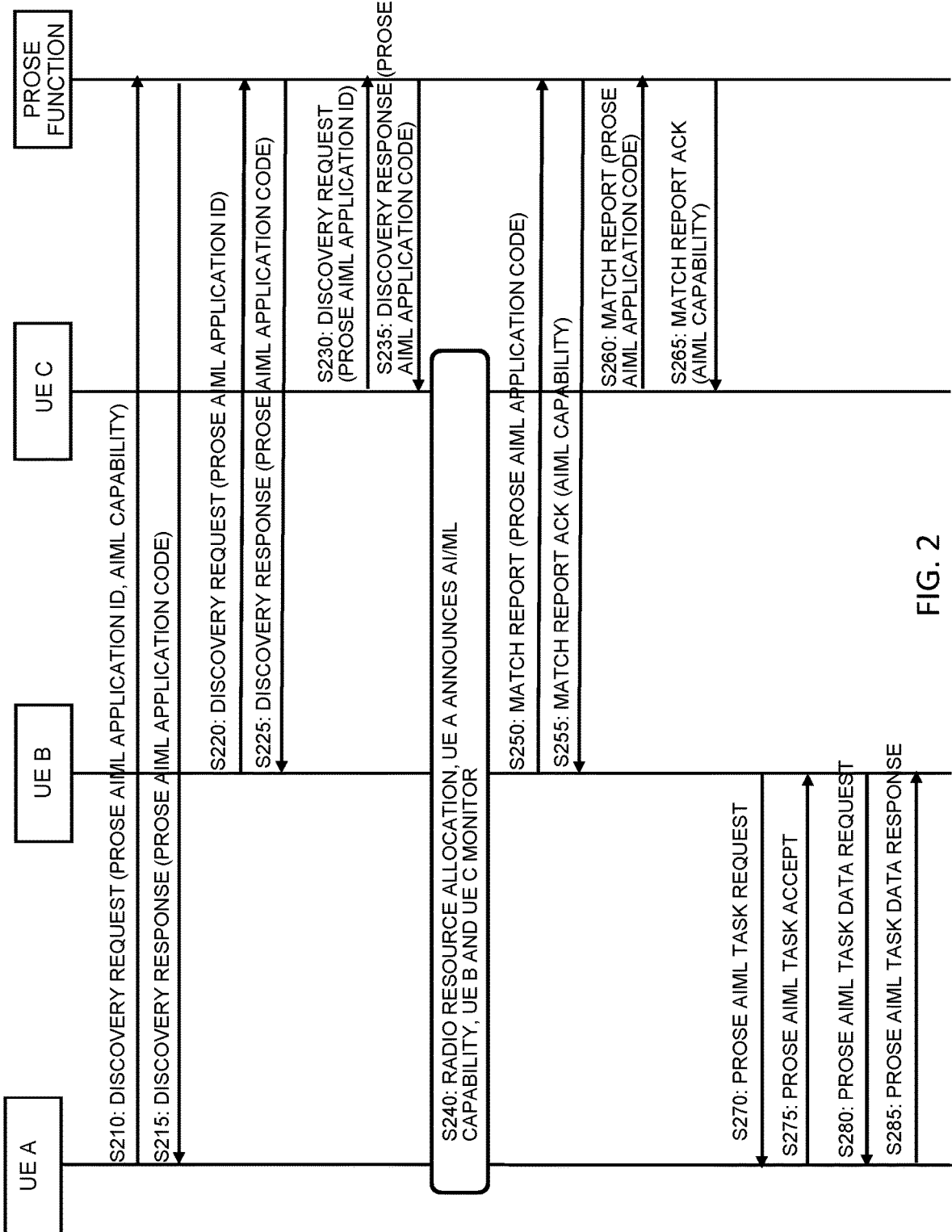
FIG. 2 shows a signaling diagram illustrating an example of a procedure allowing communication elements (UEs) to share AI/ML capabilities.

Next, with reference to FIG. 2, a processing is described by means of which the AI/ML capability of a UE can be shared with the network or with other UEs. Specifically, in the following processing, an Information Element (IE) is assumed to be introduced which can be exchanged between the network as well as the UEs so to realize AI/ML use cases.

Specifically, FIG. 2 shows a signaling diagram explaining an example of a procedure in which, as a discovery mechanism, Model A (announce, monitor) is used. However, it is to be noted that the principles of embodiments of the invention are also applicable in case, as the discovery mechanism, Model B (discoverer, discoveree) is used.

In the scenario shown in FIG. 2, with reference to FIG. 1, a situation is assumed where three UEs are present, i.e. UE A having AI/ML capability 1 with: 10 cores, 4 inference, 5 training; UE B having AI/ML capability 2 with: 5 cores, 3 inference, 2 training; and UE C having AI/ML capability 3 with: 4 cores, 3 inference, 5 training.

When UE A is capable of realizing, for example, AI/ML use cases and is willing to share its AI/ML capability, it announces to other UEs in proximity that it is capable of a specific application. For illustration, in the following, it is assumed that "ProSe_AI/ML_Application" is the AI/ML specific ProSe application for which the UE A is announcing its availability.

In a first phase, where service authorization for UEs on PC 3 interface is conducted, the UE A use the direct discovery mechanism in ProSe to "announce" its AI/ML capabilities.

That is, in case UE A is authorised to announce, in S210, it sends a discovery request message to the ProSe function in which ProSe_AI/ML_Application ID, UE A ID, announce command, and an indication of AI/ML capabilities (e.g. 10 cores, 4 inference, 5 training) are included. That is, according to examples of embodiments, the discovery request message is enhanced to add a parameter for the AI/ML capability of the UE A which is sent to the Prose function via the PC3 interface.

If the request is successful, the ProSe function provides the UE A in S215 via PC3 interface with a discovery response message in which a ProSe application code (i.e. ProSe_AI/ML application code) is sent.

After receiving the successful request response, in S240, radio resource allocation for UE A for PC5 communication is made. That is, the UE A starts announcing on PC5 interface that it is capable of handling ProSe AI/ML application ID. In addition, according to some examples of embodiments, the UE A also advertises the AI/ML capability. For example, it announces or broadcasts the discovery request message on the PC5 interface including ProSe_AI/ML_Application ID, UE A ID, announce command, and the indication of AI/ML capabilities.

In parallel, UE B and UE C are looking for a UE in their proximity which may help them to realize an AI/ML use case. That is, UE B and UE C look for a UE with better AI/ML capability than them. For example, a situation may be assumed where an image classification represents the AI/ML use case that UE B and UE C are looking for.

In S220 and S230, respectively, UE B and UE C both send a discovery request for monitoring of UEs in proximity to the ProSe function. In the discovery request message in S220, ProSe_AI/ML_Application ID, UE BID, announce command are included. In the discovery request message in S230, ProSe_AI/ML_Application ID, UE C ID, announce command are included.

If the requests are successful, the ProSe function provides the UE B in S225 and the UE C in S235 via PC3 interface with a discovery response message in which a ProSe application code (i.e. ProSe_AI/ML application code) is sent.

After receiving the successful request response, in S240, radio resource allocation for UE B and UE C for PC5 communication is made. That is, UE B and UE C start monitoring for UEs in proximity for ProSe_AI/ML_Application ID on the PC5 interface. Furthermore, the discovery message may be also broadcasted on the PC5 interface.

Now, it is assumed that e.g. UE B finds out that UE A is a UE that it is looking for, e.g. based on its AI/ML capability. In this case, UE B sends in S250 a match report message to the ProSe function with a corresponding discovery filter for ProSe_AI/ML_Application (ProSe AI/ML application code), UE ID (i.e. UE A) and monitored PLMN ID, for example.

The ProSe function processes the match report and replies in S255 with a match report ACK message. The match report ACK message comprises, besides the ProSe AI/ML application code, also an indication or parameter for AI/ML capability of the matched UE (i.e. UE A) which are available at UE B. This allows UE B to decide if it has found a UE that it is looking for in terms of AI/ML capability.

It is to be noted that according to examples of embodiments the AI/ML capability information of UE A are received by the UE B (or UE C) at two occasions. The first occasion is when the UE A announces the capability information in the discovery signaling (see e.g. S240) being received and processed by the UEB and UE C, the other occasion is in connection with the match report ACK in S265, for example. The reason for this is that the capabilities and/or resources at the UE A may be changed over time, e.g. based on its utilization. Thus, in case UE B indicates the capabilities it received during discovery in match report (sent at later time), UE A may re-negotiate or send its latest available resources in the match report ACK.

It is to be noted that the same processing described above for UE B may apply for UE C, as indicated in connection with S260 and S265.

Once UE B finds that UE A is a UE that it is looking for in the proximity, UE B starts a procedure for establishing a direct communication to UE A, e.g. in the form of a secure Layer-2 link over PC5 for One-to-One Direct Communication with UE A.

Once the communication link is successfully established, UE B negotiates with UE A on further steps to realize a AI/ML use case like AI/ML model to be used and the use case. For this, UE B sends, to UE A, in S270 a ProSe AI/ML task request for defining which task UE A has to accomplish for UE B. UE A replies, after checking the task and determining whether it is acceptable, an acceptance message to UE B in S275.

Then, in S280, UE B sends to UE A data to derive inference, e.g. as a ProSe AI/ML task data request defining, for example, inference as a task, image classification as task type, NNAPI as model detail, and data. It is to be noted that according to some examples of embodiments, the data sent by UE B to UE A may be further processed, such as encrypted and/or compressed (e.g. in the in case image data are to be exchanged), for example in order to save bandwidth or to increase security, or in order to follow communication rules, such as in call flows. In this connection, the transmission of data from UE A to UE B (described later) may follow the same processing.

UE A processes (e.g. decrypts or decompresses) the content of the message in S280 and uses it in a model to derive inference. Then, in S285, the inferred data are sent back to UE B, for example, as a ProSe AI/ML data response message indicating a success and comprising the inferred data. As indicated above, according to some examples of embodiments, also the data being re-transmitted to the UE B may be processed (encrypted, compressed etc.) if the system is configured accordingly.

As indicated above, the example described in connection with FIG. 2 is related to a use case of image classification where the UE B will share the data of an image to UE A as inference data. UE A will use the inference data to classify the image and send back the result. However, also other use case scenarios can apply the same procedure.

By means of this, UEs with different AI/ML capabilities can share each other's resources to realize AI/ML use cases.

Figure 3:
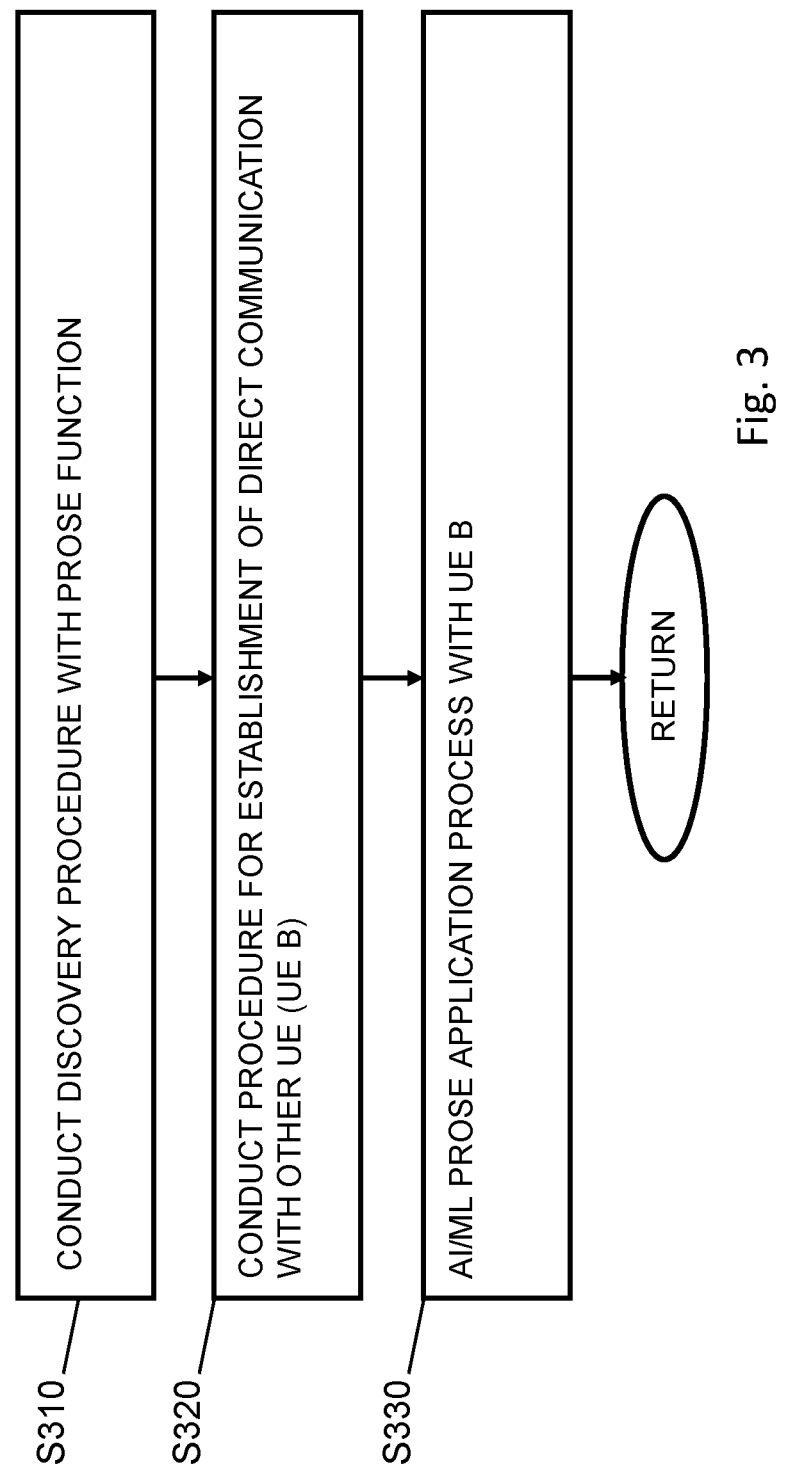
FIG. 3 shows a flow chart of a processing conducted in a communication element or function (i.e. UE A) according to some examples of embodiments.

FIG. 3 shows a flow chart of a processing executed by a communication element or function, such as a UE, specifically a UE (UE A) offering AI/ML capability to other UEs, as described above. That is, FIG. 3 shows a flowchart related to a processing conducted by a communication element or function (i.e. a UE, specifically UE A 10 of FIG. 1) configured to communicate by using ProSe or D2D communication and having AI/ML capabilities, as also described in connection with FIG. 2.

In S310, the UE (UE A) conducts a discovery procedure with a proximity service control element or function (e.g. ProSe function 40) in which a discovery request is transmitted to the proximity service control element or function. The discovery request comprising an identification of an artificial intelligence and/or machine learning proximity service application (e.g. ProSe AI/ML Application ID) and an indication of AI/ML capabilities of the UE A which can be made available for another communication element or function using proximity service.

In S320, when authorization of the discovery request is obtained from the ProSe function 40, a procedure for allowing establishment of a direct communication with another communication element or function by using proximity service is conducted. In this context, information included in the discovery request are transmitted via an interface (e.g. PC 3) for the direct communication with the another communication element or function. For example, the UE A indicates the ProSe AI/ML Application ID and the AI/ML capability information.

In S330, for executing the AI/ML ProSe application processing according to examples of embodiments, the UE A, when conducting the procedure for allowing establishment of a direct communication with the another communication element or function, establishes a direct communication channel via a proximity service interface (e.g. PC 5) to the another communication element or function (e.g. UE B). Then, with UE B, a procedure for realizing AI/ML use case like for example AI/ML model to be used according to the AI/ML ProSe application is negotiated. Finally, data are exchanged with the another communication element or function (e.g. UE B) for providing the AI/ML service, such as described in connection with S260 to S285 in FIG. 2.

According to examples of embodiments, the discovery process can be in accordance with Model A or Model B of ProSe, as described above. That is, according to some examples of embodiments, the discovery procedure to be conducted with a proximity service control element or function comprises a Model A procedure in which the UE A is configured to announce information usable by the another communication element or function for deciding on an establishment of a direct connection. Then, the procedure for allowing establishment of a direct communication with the another communication element or function comprises that the UE A broadcasts the information included in the discovery request. On the other hand, in a Model B procedure, the UE A is configured to represent a discoveree receiving information from the another communication element or function for deciding on an establishment of a direct connection. Then, the procedure for allowing establishment of a direct communication with the another communication element or function comprises reacting on a request message from the another communication element or functions.

According to some examples of embodiments, the indication of AI/ML capabilities of the UE A comprises an indication of a parameter allowing to determine and compare a capability of the communication element or function (i.e. UE A) regarding AI/ML performance. For example, the indication of the parameter comprises at least one of information regarding a processing capacity of the communication element or function; information regarding an inference level of the communication element or function; and information regarding a training level of the communication element or function. Furthermore, the identification of an AI/ML ProSe application indicates a use case.

According to some examples of embodiments, the use case is related to a commercial service using artificial intelligence and/or machine learning.

Figure 4:
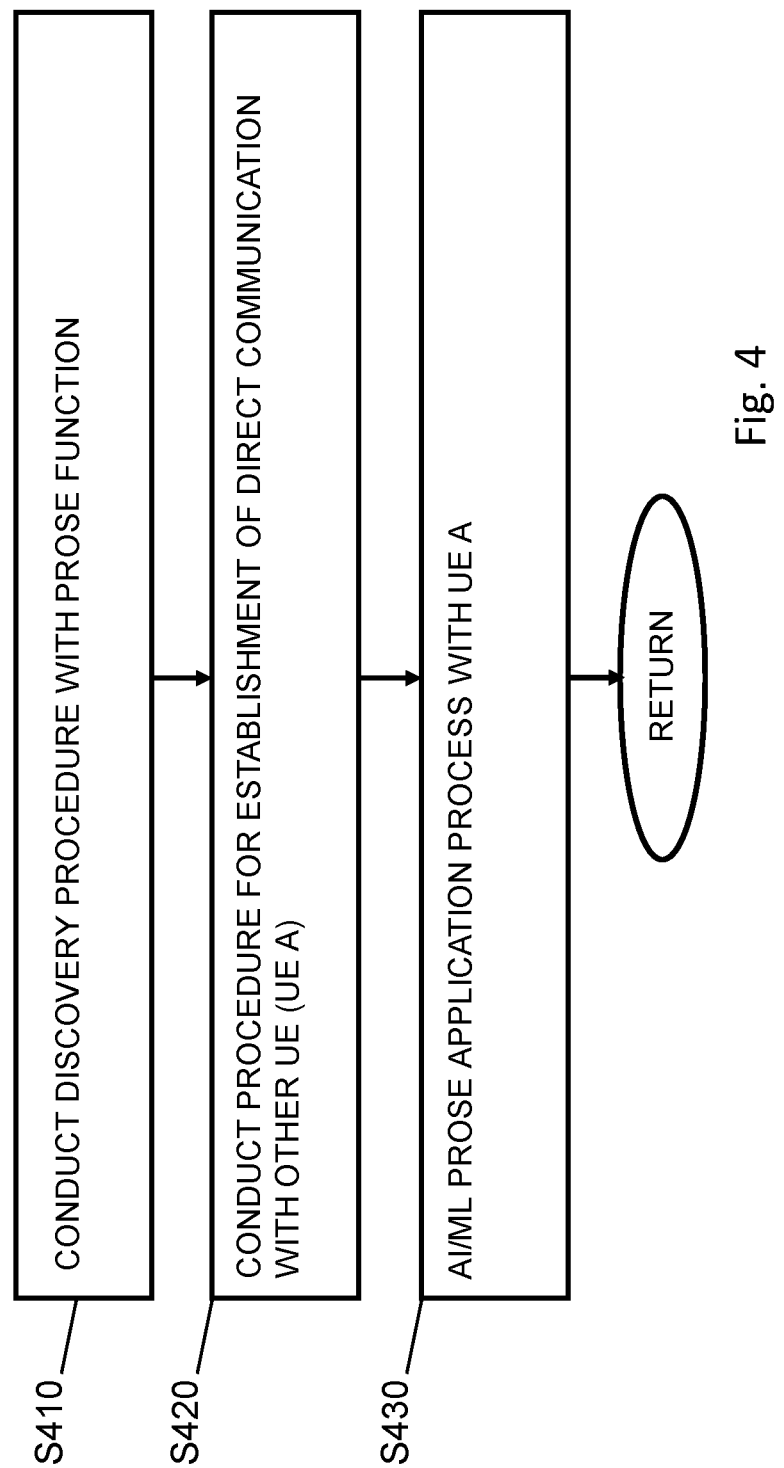
FIG. 4 shows a flow chart of a processing conducted in a communication element or function (i.e. UE B) according to some examples of embodiments.

FIG. 4 shows a flow chart of a processing executed by a communication element or function, such as a UE, specifically a UE (UE B) searching for AI/ML capability of another UE, as described above. That is, FIG. 4 shows a flowchart related to a processing conducted by a communication element or function (i.e. a UE, specifically UE B 15 of FIG. 1) configured to communicate by using ProSe or D2D communication and having AI/ML capabilities, as also described in connection with FIG. 2.

In S410, the UE conducts a discovery procedure with a ProSe control element or function (i.e. ProSe function 40, for example) in which a discovery request is transmitted to the ProSe function 40. The discovery request comprising an identification of an artificial intelligence and/or machine learning proximity service application (e.g. ProSe AI/ML Application ID).

In S420 when authorization of the discovery request is obtained from the ProSe function 40, the UE B conducts a procedure for allowing establishment of a direct communication with another communication element or function (i.e. UE A) by using proximity service. Here, the identification of the artificial intelligence and/or machine learning proximity service application (e.g. ProSe AI/ML Application ID) is used for identifying a suitable other UE for direct communication, In this connection, the UE B obtains, when the another communication element or function (i.e. UE A) is found, an indication of AI/ML learning capabilities of the another communication element or function (i.e. of UE A) which can be made available by the UE A in a matching report procedure with the ProSe function 40. Then, UE B decides on whether the another communication element or function (UE A) is contacted for the AI/ML ProSe application on the basis of a processing of the obtained indication of AI/ML capabilities of UE A.

In S430, when conducting the procedure for allowing establishment of a direct communication with UE A, a direct communication channel is established via a ProSe interface (e.g. PC 5) to UE A. In this connection, a procedure for realizing AI/ML use case like for example AI/ML model to be used is negotiated with UE A according to the AI/ML ProSe application. Furthermore, data are exchanged with UE A for providing an AI/ML service.

According to examples of embodiments, the discovery process can be in accordance with Model A or Model B of ProSe, as described above. That is, according to some examples of embodiments, the discovery procedure to be conducted with a ProSe function 40 a Model A procedure in which the UE B is configured to monitor for information usable for deciding on an establishment of a direct connection. Then, the procedure for allowing establishment of a direct communication with UE A comprises monitoring for the information included in the discovery request. On the other hand, in a Model B procedure, the UE B is configured to represent a discoverer providing information to another UE for determining whether the other UE is capable of the AI/ML ProSe application. Then, the procedure for allowing establishment of a direct communication with the UE A comprises transmitting a request message via a ProSe interface to the UE A.

According to some examples of embodiments, the indication of AI/ML capabilities of the UE A comprises an indication of a parameter allowing to determine and compare a capability of the communication element or function (i.e. UE A) regarding AI/ML performance. For example, the indication of the parameter comprises at least one of information regarding a processing capacity of the communication element or function; information regarding an inference level of the communication element or function; and information regarding a training level of the communication element or function. Furthermore, the identification of an AI/ML ProSe application indicates a use case.

According to some examples of embodiments, the use case is related to a commercial service using artificial intelligence and/or machine learning.

Figure 5:
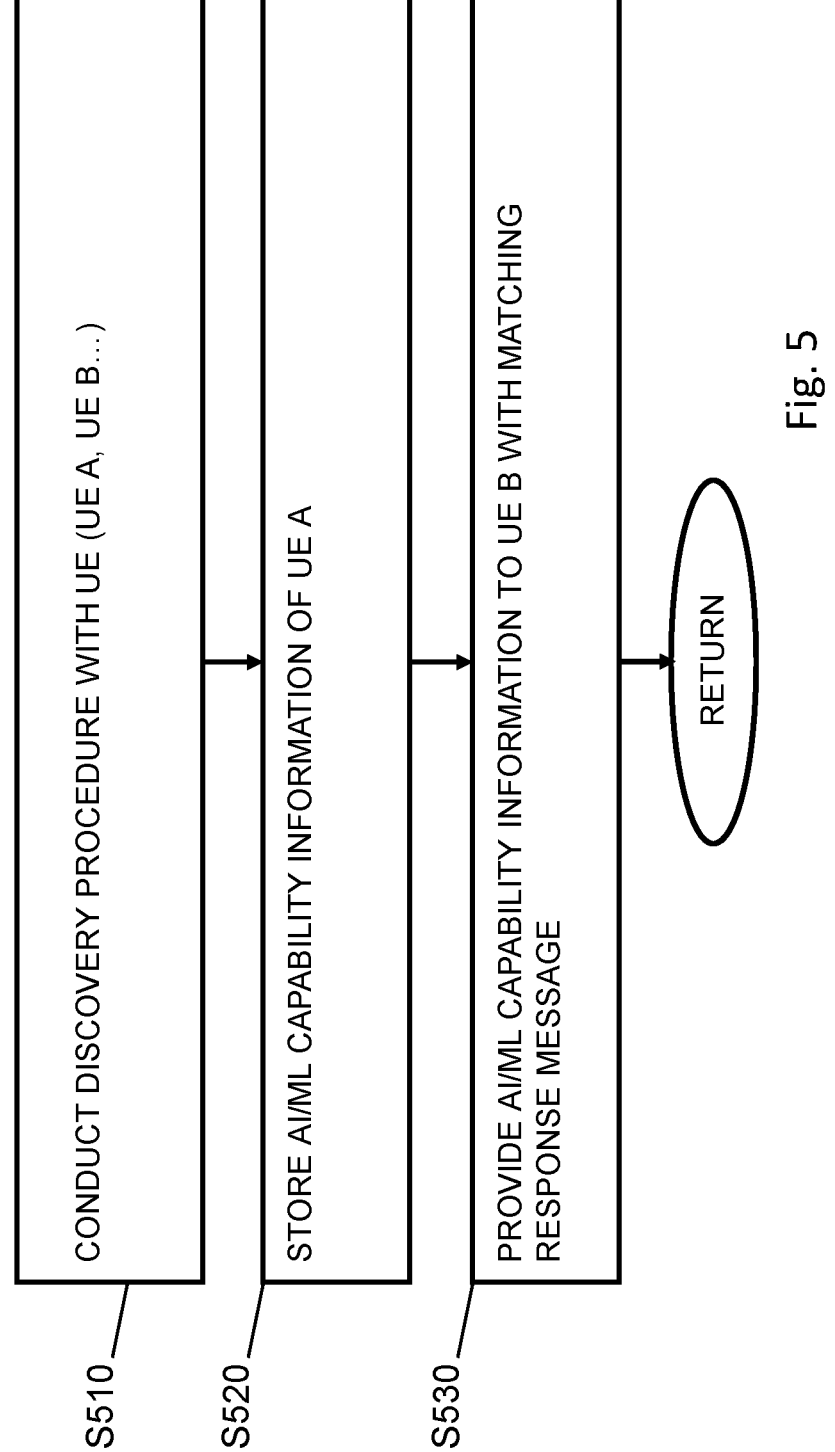
FIG. 5 shows a flow chart of a processing conducted in a communication network element or function (i.e. ProSe function) according to some examples of embodiments.

FIG. 5 shows a flow chart of a processing executed by a communication network element or function configured to act as a proximity service control element or function, such as ProSe function 40, as described above. That is, FIG. 5 shows a flowchart related to a processing conducted by a ProSe function 40 configured to control a ProSe or D2D communication, as also described in connection with FIG. 2.

In S510, the ProSe function 40 conducts a discovery procedure with a communication element or function (i.e. a UE, specifically UE A) configured to communicate by using proximity service. Specifically, a discovery request is received from the UE A, the discovery request comprising an identification of an artificial intelligence and/or machine learning proximity service application (e.g. ProSe AI/ML Application ID) and an indication of AI/ML capabilities of the UE A which can be made available for another communication element or function using proximity service.

In S520, the indication of AI/ML capabilities of UE A is stored.

In S530, an authorization process for the discovery request is conducted for enabling a procedure for allowing establishment of a direct communication of UE A with another communication element or function by using proximity service.

Furthermore, the ProSe function 40 is also configured to conduct a discovery procedure with another communication element or function (e.g. UE B) which is configured to communicate by using proximity service. Also here a discovery request is received from the another communication element or function (i.e. UE B, for example), wherein the discovery request comprising an identification of an artificial intelligence and/or machine learning proximity service application (e.g. ProSe AI/ML Application ID). When the discovery request of UE B is (also) authorized, the ProSe function can receive a matching report from UE B indicating UE A as a matching partner. In this case, the matching report is processed, and UE B is provided with the stored indication of AI/ML capabilities of UE A. As indicated above, the indication of AI/ML capability of UE A in connection with the match report ACK allows to deal with changes in resources or capability levels in UE A.

According to some examples of embodiments, the indication of AI/ML capabilities of the UE A comprises an indication of a parameter allowing to determine and compare a capability of the communication element or function (i.e. UE A) regarding AI/ML performance. For example, the indication of the parameter comprises at least one of information regarding a processing capacity of the communication element or function; information regarding an inference level of the communication element or function; and information regarding a training level of the communication element or function. Furthermore, the identification of an AI/ML ProSe application indicates a use case.

According to some examples of embodiments, the use case is related to a commercial service using artificial intelligence or machine learning.

Figure 6:
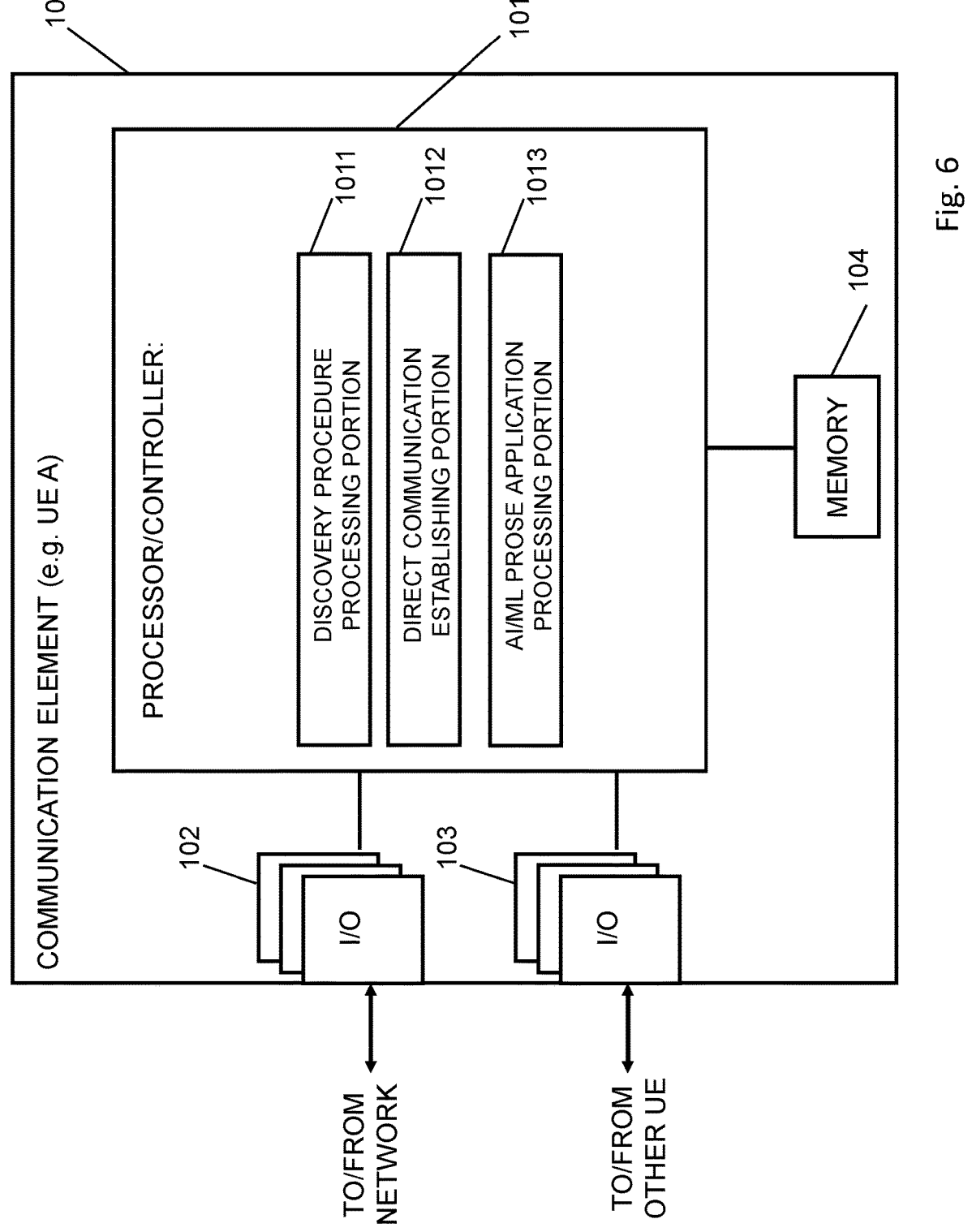
FIG. 6 shows a diagram of a network element or function acting as communication element (i.e. UE A) according to some examples of embodiments.

FIG. 6 shows a diagram of a communication element or function, such as a user equipment (UE A) which is able to offer other communication elements or functions AI/ML capabilities, according to some examples of embodiments, as described in connection with FIGS. 1 and 2, which is configured to conduct a processing according to examples of embodiments of the disclosure. It is to be noted that the communication element or function such as the UE 10 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The UE 10 shown in FIG. 6 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 102 and 103 denote input/output (I/O) units or functions (interfaces) connected to the processor or processing function 101. The I/O units 102 may be used for communicating with the communication network, such as elements or functions shown in FIG. 1. The I/O units 103 may be used for direct communication with other communication elements or functions, such as the UE B 15 shown in FIG. 1. The I/O units 102 and 103 may be combined units including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described control processing. In particular, the processor or processing circuitry or function 101 includes one or more of the following sub-portions. Sub-portion 1011 is a processing portion which is usable as a portion for conducting a discovery processing. The portion 1011 may be configured to perform processing according to S310 of FIG. 3. Furthermore, the processor or processing circuitry or function 101 may include a sub-portion 1012 usable as a portion for conducting processing for establishing a direct communication. The portion 1012 may be configured to perform a processing according to S320 of FIG. 3. In addition, the processor or processing circuitry or function 101 may include a sub-portion 1013 usable as a portion for conducting a processing regarding an AI/ML ProSe application. The portion 1013 may be configured to perform a processing according to S330 of FIG. 3.

Figure 7:
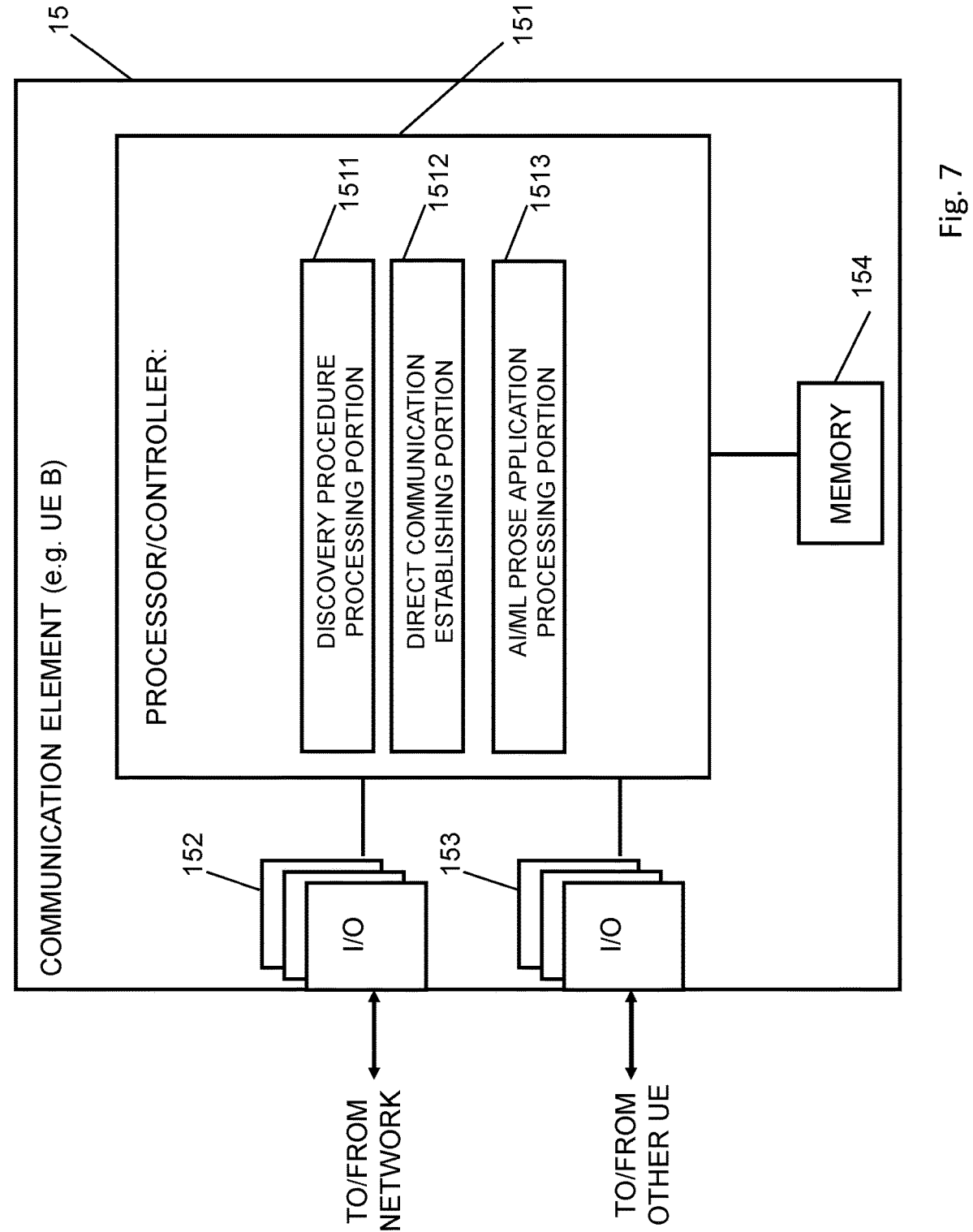
FIG. 7 shows a diagram of a network element or function acting as communication element (i.e. UE B) according to some examples of embodiments.

FIG. 7 shows a diagram of a communication element or function, such as a user equipment (UE B) which is able to use AI/ML ProSe application, according to some examples of embodiments, as described in connection with FIGS. 1 and 2, which is configured to conduct a processing according to examples of embodiments of the disclosure. It is to be noted that the communication element or function such as the UE 15 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The UE 15 shown in FIG. 7 may include a processing circuitry, a processing function, a control unit or a processor 151, such as a CPU or the like, which is suitable for executing instructions given by programs or the like related to the control procedure. The processor 151 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 152 and 153 denote input/output (I/O) units or functions (interfaces) connected to the processor or processing function 151. The I/O units 152 may be used for communicating with the communication network, such as elements or functions shown in FIG. 1. The I/O units 153 may be used for direct communication with other communication elements or functions, such as the UE A 10 shown in FIG. 1. The I/O units 152 and 153 may be combined units including communication equipment towards several entities, or may include a distributed structure with a plurality of different interfaces for different entities. Reference sign 154 denotes a memory usable, for example, for storing data and programs to be executed by the processor or processing function 151 and/or as a working storage of the processor or processing function 151. It is to be noted that the memory 154 may be implemented by using one or more memory portions of the same or different type of memory.

The processor or processing function 151 is configured to execute processing related to the above described control processing. In particular, the processor or processing circuitry or function 151 includes one or more of the following sub-portions. Sub-portion 1511 is a processing portion which is usable as a portion for conducting a discovery processing. The portion 1511 may be configured to perform processing according to S410 of FIG. 4. Furthermore, the processor or processing circuitry or function 151 may include a sub-portion 1512 usable as a portion for conducting processing for establishing a direct communication. The portion 1512 may be configured to perform a processing according to S420 of FIG. 4. In addition, the processor or processing circuitry or function 151 may include a sub-portion 1513 usable as a portion for conducting a processing regarding an AI/ML ProSe application. The portion 1513 may be configured to perform a processing according to S430 of FIG. 4.

It is to be noted that a communication element or function, such as a UE, may have means and functions allowing to act in both roles, i.e. the role of an AI/ML capability provider such as UE A, and the role of an AI/ML capability user, such as UE B. In other words, the elements and functions discussed in connection with FIGS. 3, 4, 6 and 7 may be arranged in one and the same communication element of function (i.e. UE).

Figure 8:
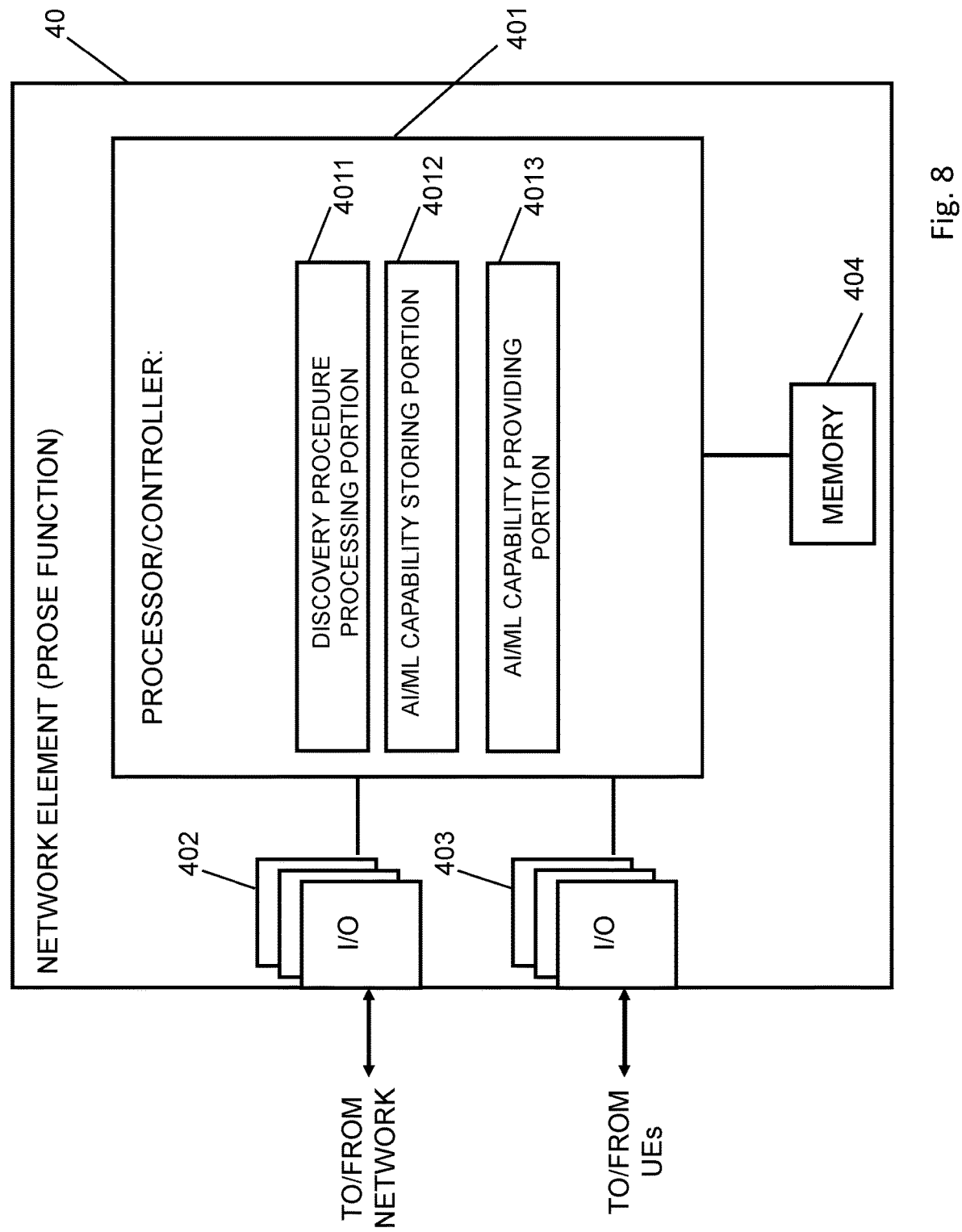
FIG. 8 shows a diagram of a network element or function acting as ProSe function according to some examples of embodiments.

FIG. 8 shows a diagram of a network element or function acting as a proximity service function (ProSe function) 40 according to some examples of embodiments, as described in connection with FIGS. 1 and 2, which is configured to conduct a processing according to examples of embodiments of the disclosure. It is to be noted that the network element or function such as the ProSe function 40 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The ProSe function 40 shown in FIG. 8 may include a processing circuitry, a processing function, a control unit or a processor 401, such as a CPU or the like, which is suitable for executing instructions given by programs or the like related to the control procedure. The processor 401 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 402 and 403 denote input/output (I/O) units or functions (interfaces) connected to the processor or processing function 401. The I/O units 402 may be used for communicating with the communication network, such as elements or functions shown in FIG. 1. The I/O units 403 may be used for direct communication with communication elements or functions, such as the UEs 10 and 15 shown in FIG. 1. The I/O units 402 and 403 may be combined units including communication equipment towards several entities, or may include a distributed structure with a plurality of different interfaces for different entities. Reference sign 404 denotes a memory usable, for example, for storing data and programs to be executed by the processor or processing function 401 and/or as a working storage of the processor or processing function 401. It is to be noted that the memory 404 may be implemented by using one or more memory portions of the same or different type of memory.

The processor or processing function 401 is configured to execute processing related to the above described control processing. In particular, the processor or processing circuitry or function 401 includes one or more of the following sub-portions. Sub-portion 4011 is a processing portion which is usable as a portion for conducting a discovery processing. The portion 4011 may be configured to perform processing according to S510 of FIG. 5. Furthermore, the processor or processing circuitry or function 401 may include a sub-portion 4012 usable as a portion for storing AI/ML capability information. The portion 4012 may be configured to perform a processing according to S520 of FIG. 5. In addition, the processor or processing circuitry or function 401 may include a sub-portion 4013 usable as a portion for conducting providing AI/ML capability information. The portion 4013 may be configured to perform a processing according to S530 of FIG. 5.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operation environment may be used in connection with examples of embodiments of the disclosure based on the principles defined.

According to a further example of embodiments, there is provided, for example, an apparatus for use by a communication element or function configured to communicate by using proximity service communication and having artificial intelligence or machine learning capabilities, the apparatus comprising means configured to conduct a discovery procedure with a proximity service control element or function in which a discovery request is transmitted to the proximity service control element or function, the discovery request comprising an identification of an artificial intelligence and/or machine learning proximity service application and an indication of artificial intelligence and/or machine learning capabilities of the communication element or function which can be made available for another communication element or function using proximity service, and means configured to conduct, when authorization of the discovery request is obtained from the proximity service control element or function, a procedure for allowing establishment of a direct communication with another communication element or function by using proximity service wherein information included in the discovery request are transmitted via an interface for the direct communication with the another communication element or function.

Furthermore, according to some other examples of embodiments, the above defined apparatus may further comprise means for conducting at least one of the processing defined in the above described methods, for example a method according to that described in connection with FIG. 3.

According to a further example of embodiments, there is provided, for example, an apparatus for use by a communication element or function configured to communicate by using proximity service communication and having artificial intelligence and/or machine learning capabilities, the apparatus comprising means configured to conduct a discovery procedure with a proximity service control element or function in which a discovery request is transmitted to the proximity service control element or function, the discovery request comprising an identification of an artificial intelligence and/or machine learning proximity service application, means configured to conduct, when authorization of the discovery request is obtained from the proximity service control element or function, a procedure for allowing establishment of a direct communication with another communication element or function by using proximity service, wherein the identification of the artificial intelligence and/or machine learning proximity service application is used for identifying another communication element or function for direct communication, means configured to obtain, when the another communication element or function is found, an indication of artificial intelligence and/or machine learning capabilities of the another communication element or function which can be made available by the another communication element or function in a matching report procedure with the proximity service control element or function, and means configured to decide on whether the another communication element or function is contacted for the artificial intelligence and/or machine learning proximity service application on the basis of a processing of the obtained indication of artificial intelligence and/or machine learning capabilities of the another communication element or function.

Furthermore, according to some other examples of embodiments, the above defined apparatus may further comprise means for conducting at least one of the processing defined in the above described methods, for example a method according to that described in connection with FIG. 4.

According to a further example of embodiments, there is provided, for example, an apparatus for use by a communication network element or function configured to act as a proximity service control element or function for a proximity service communication, the apparatus comprising means configured to conduct a discovery procedure with a communication element or function configured to communicate by using proximity service, wherein a discovery request is received from the communication element or function, the discovery request comprising an identification of an artificial intelligence and/or machine learning proximity service application and an indication of artificial intelligence and/or machine learning capabilities of the communication element or function which can be made available for another communication element or function using proximity service, means configured to store the indication of artificial intelligence and/or machine learning capabilities of the communication element or function, and means configured to conduct an authorization process for the discovery request for enabling a procedure for allowing establishment of a direct communication of the communication element or function with another communication element or function by using proximity service.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, a non-transitory computer readable medium comprising program instructions for causing an apparatus to perform, when used in a communication element or function configured to communicate by using proximity service communication and having artificial intelligence or machine learning capabilities, a processing comprising conducting a discovery procedure with a proximity service control element or function in which a discovery request is transmitted to the proximity service control element or function, the discovery request comprising an identification of an artificial intelligence and/or machine learning proximity service application and an indication of artificial intelligence and/or machine learning capabilities of the communication element or function which can be made available for another communication element or function using proximity service, and conducting, when authorization of the discovery request is obtained from the proximity service control element or function, a procedure for allowing establishment of a direct communication with another communication element or function by using proximity service wherein information included in the discovery request are transmitted via an interface for the direct communication with the another communication element or function.

According to a further example of embodiments, there is provided, for example, a non-transitory computer readable medium comprising program instructions for causing an apparatus to perform, when used in a communication element or function configured to communicate by using proximity service communication and having artificial intelligence and/or machine learning capabilities, a processing comprising conducting a discovery procedure with a proximity service control element or function in which a discovery request is transmitted to the proximity service control element or function, the discovery request comprising an identification of an artificial intelligence and/or machine learning proximity service application, conducting, when authorization of the discovery request is obtained from the proximity service control element or function, a procedure for allowing establishment of a direct communication with another communication element or function by using proximity service, wherein the identification of the artificial intelligence and/or machine learning proximity service application is used for identifying another communication element or function for direct communication, obtaining, when the another communication element or function is found, an indication of artificial intelligence and/or machine learning capabilities of the another communication element or function which can be made available by the another communication element or function in a matching report procedure with the proximity service control element or function, and deciding on whether the another communication element or function is contacted for the artificial intelligence and/or machine learning proximity service application on the basis of a processing of the obtained indication of artificial intelligence and/or machine learning capabilities of the another communication element or function.

According to a further example of embodiments, there is provided, for example, a non-transitory computer readable medium comprising program instructions for causing an apparatus to perform, when used in a communication network element or function configured to act as a proximity service control element or function for a proximity service communication, a processing comprising conducting a discovery procedure with a communication element or function configured to communicate by using proximity service, wherein a discovery request is received from the communication element or function, the discovery request comprising an identification of an artificial intelligence and/or machine learning proximity service application and an indication of artificial intelligence and/or machine learning capabilities of the communication element or function which can be made available for another communication element or function using proximity service, storing the indication of artificial intelligence and/or machine learning capabilities of the communication element or function, and conducting an authorization process for the discovery request for enabling a procedure for allowing establishment of a direct communication of the communication element or function with another communication element or function by using proximity service.

That is, according to examples of embodiments as described above, means are provided which allow to indicate a UE AI/ML capability (e.g. by a corresponding IE) that can be exchanged with the network or other UEs.

Via D2D related interfaces, e.g. via a PC3 Interface of ProSe, additional parameters or information can be exchanged in connection with a discovery request so as to advertise the AI/ML capability of the UE. Furthermore, additional parameter to let a monitoring UE know about the AI/ML capability of an announcing UE can be made available e.g. by means of a match report acknowledgement.

Furthermore, e.g. via a PC5 interface, discovery support can be enhanced with additional application capability to advertise AI/ML capability of the UE. For example, the PC5 interface is enhanced for commercial ProSe services use cases. Moreover, AI/ML capability of the UE can be exchanged in the PC5 interface. In addition, AI/ML related application/services can be supported over PC5 interface By means of embodiments of the present invention, it is possible to that UEs having diverse AI/ML capabilities and being in close proximity to each other can support each other with regard to AI/ML capabilities and use cases. That is, by using the above described processing, for example, a more AI/ML capable UE can aid a less AI/ML capable UE to realize its AI/ML use cases. Thus the UE which provides the AI/ML services can improve its AI/ML efficiency, while the UE which receives the AI/ML services can realize its AI/ML use cases in a better way.

By means of the above described principles, the QoE of AI/ML use cases is improved since there is an increase in exchanges of model data and training data from various devices of different AI/ML capabilities. Moreover, load on the operator network can be reduced due to usage of D2D communication.

It should be appreciated that
an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus comprising
at least one processor, and
at least one memory for storing instructions to be executed by the at least one processer,
wherein the at least one memory and the instructions are configured to, with the at least one processor, cause the apparatus at least to:
conduct a discovery procedure with a proximity service control element or function in which a discovery request is transmitted to the proximity service control element or function, the discovery request comprising
an identification of an artificial intelligence and/or machine learning proximity service application and an indication of artificial intelligence and/or machine learning capabilities of the apparatus which can be made available to a further apparatus using a proximity service;

conduct, based on authorization of the discovery request being obtained from the proximity service control element or function, a procedure for allowing establishment of a direct communication with the further apparatus using the proximity service, such that information included in the discovery request is transmittable via an interface for the direct communication with the further apparatus.

2. The apparatus according to claim 1, wherein the at least one memory and the instructions are further configured to, with the at least one processer, cause the apparatus at least to:

establish, when conducting the procedure for allowing establishment of a direct communication with the further apparatus, a direct communication channel via a proximity service interface to the further apparatus, negotiate, with the further apparatus, a procedure for realizing an artificial intelligence and/or machine learning use case according to the artificial intelligence and/or machine learning proximity service application, and exchange data with the further apparatus for providing an artificial intelligence and/or machine learning service.

3. The apparatus according to claim 1, wherein the discovery procedure to be conducted with the proximity service control element or function comprises a first procedure in which the apparatus is configured to announce information usable by the further apparatus for deciding on an establishment of a direct connection, wherein the procedure for allowing establishment of a direct communication with the further apparatus comprises broadcasting the information included in the discovery request.

4. The apparatus according to claim 1, wherein the discovery procedure to be conducted with the proximity service control element or function comprises a second procedure in which the apparatus is configured to represent a discoveree receiving information from the further apparatus for deciding on an establishment of a direct connection, wherein the procedure for allowing establishment of a direct communication with the further apparatus comprises reacting on a request message from the further apparatus.

5. The apparatus according to claim 1, wherein the indication of artificial intelligence and/or machine learning capabilities of the apparatus comprises an indication of a parameter allowing to determine and compare a capability of the apparatus regarding artificial intelligence and/or machine learning performance.

6. The apparatus according to claim 5, wherein the indication of artificial intelligence and/or machine learning capabilities of the apparatus comprises the identification of the artificial intelligence and/or machine learning proximity service application indicates a use case.

7. The apparatus according to claim 6, wherein the use case is related to a commercial service using artificial intelligence and/or machine learning.

8. An apparatus comprising at least processor, and at least one memory for storing instructions to be executed by the at least one processor, wherein the at least one memory and the instructions are configured to, with the at least one processor, cause the apparatus at least to:

conduct a discovery procedure with a proximity service control element or function in which a discovery request is transmitted to the proximity service control element or function, the discovery request comprising an identification of an artificial intelligence and/or machine learning proximity service application, conduct, when authorization of the discovery request is obtained from the proximity service control element or function, a procedure for allowing establishment of a direct communication with a further apparatus using a proximity service, wherein the identification of the artificial intelligence and/or machine learning proximity service application is used for identifying the further apparatus for direct communication, obtain, when the further apparatus is found, an indication of artificial intelligence and/or machine learning capabilities of the further apparatus which can be made available by the further apparatus in a matching report procedure with the proximity service control element or function, and decide on whether the further apparatus is contacted for the artificial intelligence and/or machine learning proximity service application on the basis of a processing of the obtained indication of artificial intelligence and/or machine learning capabilities of the further apparatus.

9. The apparatus according to claim 8, wherein the at least one memory and the instructions are further configured to, with the at least one processor, cause the apparatus at least to:

establish, when conducting the procedure for allowing establishment of a direct communication with the further apparatus, a direct communication channel via a proximity service interface to the further apparatus, negotiate, with the further apparatus, a procedure for realizing artificial intelligence and/or machine learning use case according to the artificial intelligence and/or machine learning proximity service application, and exchange data with the further apparatus for providing an artificial intelligence and/or machine learning service.

10. The apparatus according to claim 8, wherein the discovery procedure to be conducted with the proximity service control element or function comprises a first procedure in which the apparatus is configured to monitor for information usable for deciding on an establishment of a direct connection, wherein the procedure for allowing establishment of a direct communication with the further apparatus comprises monitoring for the information included in the discovery request.

11. The apparatus according to claim 8, wherein the discovery procedure to be conducted with the proximity service control element or function comprises a second procedure in which the apparatus is configured to represent a discoverer providing information to the further apparatus for determining whether the further apparatus is capable of the artificial intelligence and/or machine learning proximity service application, wherein the procedure for allowing establishment of a direct communication with the further apparatus comprises transmitting a request message via a proximity service interface to the further apparatus.

12. The apparatus according to claim 8, wherein the indication of artificial intelligence and/or machine learning capabilities of the further apparatus comprises an indication of a parameter allowing to determine and compare a capability of the further apparatus regarding artificial intelligence and/or machine learning performance.

13. The apparatus according to claim 12, wherein the indication of artificial intelligence and/or machine learning capabilities of the further apparatus comprises the identification of the artificial intelligence and/or machine learning proximity service application indicates a use case.

14. The apparatus according to claim 13, wherein the use case is related to a commercial service using artificial intelligence and/or machine learning.

15. An apparatus comprising at least one processor, and at least one memory for storing instructions to be executed by the at least one processor, wherein the at least one memory and the instructions are configured to, with the at least one processor, cause the apparatus at least to:

conduct a discovery procedure with an apparatus configured to communicate using a proximity service, wherein a discovery request is received from the apparatus, the discovery request comprising an identification of an artificial intelligence and/or machine learning proximity service application and an indication of artificial intelligence and/or machine learning capabilities of the apparatus which can be made available to a further apparatus using the proximity service, store the indication of artificial intelligence and/or machine learning capabilities of the apparatus, and conduct an authorization process for the discovery request for enabling a procedure for allowing establishment of a direct communication of the apparatus with the further apparatus using the proximity service.

16. The apparatus according to claim 15, wherein the at least one memory and the instructions are further configured to, with the at least one processor, cause the apparatus at least to:

conduct a discovery procedure with the further apparatus configured to communicate using the proximity service, wherein a discovery request is received from the further apparatus, the discovery request comprising an identification of an artificial intelligence and/or machine learning proximity service application, receive, after the discovery request of the further apparatus is authorized, a matching report of the further apparatus indicating the apparatus, and to process the matching report, and provide the further apparatus with the stored indication of artificial intelligence and/or machine learning capabilities of the apparatus.

17. The apparatus according to claim 15, wherein the indication of artificial intelligence or machine learning capabilities of the apparatus comprises an indication of a parameter allowing to determine and compare a capability of the apparatus regarding artificial intelligence and/or machine learning performance.

18. The apparatus according to claim 17, wherein the indication of artificial intelligence or machine learning capabilities of the apparatus comprises the identification of the artificial intelligence and/or machine learning proximity service application indicates a use case.

19. The apparatus according to claim 18, wherein the use case is related to a commercial service using artificial intelligence and/or machine learning.

* * * * *